United States Patent [19]

Wiezer et al.

[11] 4,308,362
[45] Dec. 29, 1981

[54] COPOLYMERS OF SUBSTITUTED PIPERIDINES, THEIR MANUFACTURE AND USE

[75] Inventors: Hartmü Wiezer, Gersthofen; Gerhard Pfahler, Augsburg; Norbert Mayer, Gablingen, all of Fed. Rep. of Germany

[73] Assignee: Hoechst Aktiengesellschaft, Fed. Rep. of Germany

[21] Appl. No.: 150,733

[22] Filed: May 19, 1980

[30] Foreign Application Priority Data

May 23, 1979 [DE] Fed. Rep. of Germany ....... 2920918

[51] Int. Cl.³ .......................... C08F 8/00; C08F 222/22
[52] U.S. Cl. .................................... 525/328; 525/203; 525/375; 526/265
[58] Field of Search ................ 526/265, 306; 525/375, 525/328

[56] References Cited

U.S. PATENT DOCUMENTS 2,687,400  8/1954  D'Alelio .............................. 526/265
2,687,401  8/1954  D'Alelio .............................. 526/265
3,355,518  11/1967  Sullivan et al. ...................... 526/306

Primary Examiner—Harry Wong, Jr.
Attorney, Agent, or Firm—Connolly and Hutz

[57] ABSTRACT

The invention relates to copolymers of polyalkyl piperidines which are substituted by a polymerizable group and which have the formula

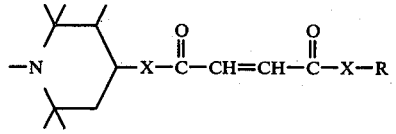

with olefinic comonomers such as ethylene, styrene, vinyl acetate, acrylates or methacrylates. The copolymers which have a molecular weight of from 1,000 to 10,000 are used as light stabilizers for synthetic polymers which do not migrate to the surface of the polymers.

2 Claims, No Drawings

COPOLYMERS OF SUBSTITUTED PIPERIDINES, THEIR MANUFACTURE AND USE

The invention relates to novel polymers of polyalkyl piperidines substituted by a polymerizable group and of olefinic compounds, a process for their manufacture and their use as light stabilizers for synthetic polymers.

Copolymers of 4-(meth)acryloyloxy-2,2,6,6-tetramethylpiperidine compounds with ethylenic monomers, as well as addition and condensation polymers containing polyalkyl piperidine groups have already been known (German Offenlegungsschrift No. 2,748,362 or No. 2,719,171). They are active as light stabilizers for plastics, but have not gained any importance on the market as yet. Of the piperidine stabilizers, only a compound of relatively low molecular weight, i.e. bis-(2,2,6,6-tetramethyl-4-piperidyl)-sebacate, is used to a greater extent (German Pat. No. 1,929,928, German Offenlegungsschrift No. 2,204,659).

It is a drawback of all these stabilizers known so far that they do not meet the requirements established by industry in all technologically relevant parameters, for example with regard to volatility, migration stability or the capability of being washed out and the compatibility with the polymers to be stabilized. For example, an exceedingly high volatility leads with the high processing temperatures of 200° to 300° C. to a considerable and undesirable stabilizer loss. In the case of poor compatibility, the stabilizer may migrate to the polymer surface, while forming a coating which can easily be rubbed off mechanically. An insufficient migration stability becomes also evident when wetting the stabilized polymers with solvents; especially water is a strongly eluting factor in all-weather use. In this respect the feature of being easily washed out with water of the stabilizer involves a rapid decrease of its activity [cf. also J. Durwins et al., Europ. Polym. J. 11 (1975) 219; R.W. Kuchkuda Plastic Engineering 1977 (June), 32].

It has now been found that copolymers of polyalkyl piperidines not known so far, which are substituted by a polymerizable group, and determined olefinic compounds surprisingly do not show these drawbacks.

The novel polymers are copolymers of one or several polyalkyl piperidines of the formula (I)

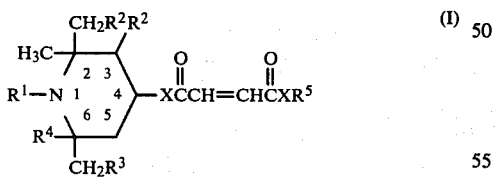

and one or several comonomers of the formula (II)

with a molecular weight of from about 1000 to about 10,000, wherein in the monomers of the formula (I)

$R^1$ is hydrogen or $C_1$ to $C_{18}$-alkyl, preferably hydrogen or $C_1$ to $C_4$-alkyl and especially hydrogen, $R^2$ and $R^3$ are either the same and represent hydrogen or $C_1$ to $C_5$-alkyl, preferably hydrogen or methyl and especially hydrogen, in which case $R^4$ is methyl, or $R^2$ is hydrogen or $C_1$ to $C_5$-alkyl, in which case $R^3$ and $R^4$, together with the carbon atoms to which they are bound, represent a $C_5$ or $C_6$-cycloalkyl group or a group of the formula (III)

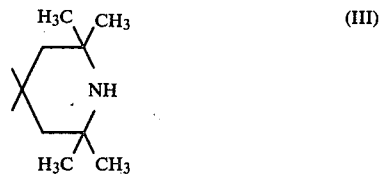

$R^5$ is hydrogen, $C_1$ to $C^{18}$-alkyl or a group of the formula (IV)

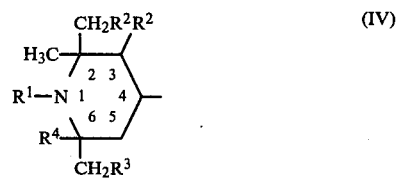

in which $R^1$, $R^2$, $R^3$ and $R^4$ are defined as above, but preferably represent hydrogen or $C_1$ to $C_{12}$-alkyl or a group of the formula (IV) and especially hydrogen, $C_1$ to $C_6$-alkyl or a group of the formula (IV), X stands in particular for oxygen and also for a radical —$NR^6$, $R^6$ being hydrogen, $C_1$ to $C_{18}$-alkyl or a group of the formula (IV), preferably hydrogen or $C_1$ to $C_{18}$-alkyl, whereas in the monomers of the formula (II)

$R^7$ is hydrogen or a group of the formula $COOR^{10}$ with $R^{10}$ being $C_1$ to $C_{18}$-alkyl, but preferably hydrogen, $R^8$ is hydrogen or methyl, preferably hydrogen, and $R^9$ is hydrogen or $C_1$ to $C_{36}$-alkyl, preferably hydrogen or $C_1$ to $C_{18}$-alkyl and especially hydrogen, or is phenyl or chlorine, or acetyl, or a group of the formula —$OR^{11}$ with $R^{11}$ being hydrogen or $C_1$ to $C_{18}$-alkyl, or a group of the formula —$COOR^{12}$ with $R^{12}$ being alkyl or hydroxyalkyl with 1 to 18 carbon atoms or a radical of the formula (IV), preferably an alkyl or hydroxyalkyl group of 1 to 6 carbon atoms or a radical of the formula (VI).

It was not to be foreseen that the copolymers of the invention would be free from the drawbacks regarding their properties as stabilizers, which drawbacks become evident in the polymers and monomeric stabilizers of German Offenlegungsschriften Nos. 1,929,928; 2,204,659; 2,719,171 and 2,748,362 as the novel compounds are very similar to the latter products as for parts of their structure. Yet in contradistinction to this assumption the novel piperidine group-containing copolymers are not only excellently suitable for the stabilization of organic polymers to the degradation by light and heat, but are also marked by low volatility, very good migration stability and a surprisingly good compatibility with the polymers to be stabilized, in spite of their polymeric character.

The novel copolymers are prepared according to virtually known processes, as they are applied for the copolymerization of ethylene (cf. Houben/Weyl vol. 14/1, p. 620) or other comonomers (Ccf. Houben/Weyl vol. 14/1, pp. 188, 487, 813-815, 918, 972).

Monomers of the formula (I) have for example been known from German Offenlegungsschriften No. 1,929,928; 2,204,659; 2,258,752; 2,623,422; 2,621,870 and may be obtained according to the specifications given therein. There may be mentioned, for example:

Bis-(2,2,6,6-tetramethyl-4-piperidyl)-fumarate
fumaric acid-1'-(2,2,6,6-tetramethyl-4-piperidyl)-4'-methyl ester
fumaric acid-1'-(2,2,6,6-tetramethyl-4-piperidyl)-4'-ethyl ester
fumaric acid-1'-(2,2,6,6-tetramethyl-4-piperidyl)-4'-hexyl ester
bis-(2,2,6,6-tetramethyl-4-piperidyl)-maleinate
maleic acid-1'-(2,2,6,6-tetramethyl-4-piperidyl)-4'-methyl ester
maleic acid-1'-(2,2,6,6-tetramethyl-4-piperidyl)-4'-ethyl ester
maleic acid-1'-(2,2,6,6-tetramethyl-4-piperidyl)-4'-hexyl ester.

Comonomers of the formula (II) are, for example, ethylene, styrene, vinyl acetate, acrylates and methacrylates.

For the copolymerization, the monomers are employed in at least equimolar amounts, but the monomer ratio may vary within certain limits, however, generally 1:1 copolymers are to be expected from the first due to known copolymerization parameters (cf. Houben/Weyl vol. 14, p. 101 et seq.). The polymerization degree can be influenced to a certain extent by the amount of polymerization catalyst used: the higher the amount of catalyst, the lower is the polymerization degree which can be reached.

Thus, the copolymers of the invention have a molecular weight of from about 1,000 to about 10,000, preferably from about 1,000 to about 6,000 and especially from about 1,500 to about 6,000. Depending on the compounds (I) subjected to the copolymerization and on the kind and amount of the comonomers (II), the nitrogen content of the piperidine ring is from 0.5 to 6.6, preferably from 1 to 6.0 and especially from 1.0 to 4.0%.

When carrying out the polymerization process, a preferred method involves introducing the monomer or a monomer mixture of the formula (I) in an organic solvent, such as benzene, toluene, xylene, iso-octane, cyclohexane, tert.butanol, ethyl acetate, butyl acetate or water, together with from 0.01 to 15, preferably 2 to 15% by weight, calculated on the total monomers, of an ion forming agent (alkali metal amide) or of a common radical forming agent (azo compounds, peroxidic compounds), preferably of the latter, but especially of $\alpha,\alpha'$-azo-bisisobutyronitrile, optionally while adding from 2 to 6% by weight of an emulsifying agent, calculated on the total monomers (for example, Na-octadecyl sulfate, Na-lauryl sulfate), adding the comonomer or a comonomer mixture of the formula (II) and performing the reaction at a temperature of from 50° to 180° C., preferably 70° to 150° C. and especially 80° to 120° C. In the case of gaseous comonomers (II), the polymerization is carried out in a pressure vessel with stirrer, and a pressure of from 20 to 300, preferably 50 to 250 and especially 50 to 150 bars is adjusted.

The reaction period is generally from 2 to 20 hours. The polymers separating from the reaction mixture are isolated by filtration. Polymers which are obtained in the form of a gel may be worked up by eliminating the solvent by distillation and can be purified by reprecipitation.

Another possibility to manufacture the products of the invention involves first preparing copolymers from lower alkyl esters of fumaric acid or maleic acid or from maleic acid anhydride and compounds of the formula (II) and then reacting the same with polyalkyl piperidine compounds of the general formula (VI)

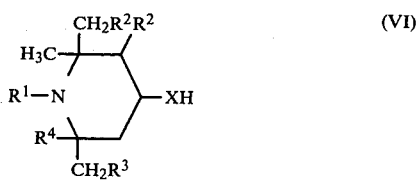

When using maleic acid anhydride copolymers, this reaction is carried out by heating in an inert organic solvent to 50° to 150° C., whereas the use of fumaric and maleic acid ester copolymers in inert organic solvents with a boiling point of from 80° to 250° C., especially from 100° to 150° C., for example (cyclo)-aliphatic or aromatic hydrocarbons (gasoline fractions, toluene, xylene, mesitylene, etc.) requires the addition of from 0.1 to 10% by weight of basic transesterification catalysts, such as alkali metal alcoholates and alkali metal amides. The reaction alcohol is removed continuously from the reaction mixture by column distillation. This removal may be supported by simultaneously passing nitrogen through the mixture.

If according to this process there are to be prepared those polymers in which formally a monomer (I) with $-XR^5=-O-C_1$ to $C_{18}$-alkyl or $-N-C_1$ to $C_{18}$-alkyl is involved, the corresponding alcohol or the corresponding amine is added in the equimolar amount, calculated on the polyalkyl piperidine compound, in the reaction of the copolymer with the polyalkyl piperidine compound (VI).

As has already been mentioned before, the novel copolymers are excellently suitable as light stabilizers for synthetic polymers, particularly valuable being those in which X is oxygen and $R^5$ represents a radical of the formula (IV).

Synthetic polymers in the sense of the present specification are the following:

Halogen-free and halogen-containing homo- and copolymers, more particularly homopolymers of $C_1$ to $C_4$-α-olefins, dienes and styrene, such as for example, polyethylene of low and high density, polypropylene, polystyrene, polybutadiene and polyisoprene; copolymers of olefins, dienes and styrene with one another or with other olefinically unsaturated monomers, such as, for example, ethylene-propylene copolymers, ethylene-butene copolymers, styrene-butadiene copolymers, ethylene-vinyl acetate copolymers and acrylonitrile-butadiene-styrene copolymers, homopolymers of vinyl chloride and vinylidene chloride as well as copolymers of the said monomers with one another and with other olefinically unsaturated monomers. The term synthetic polymer is also intended to include polyurethanes polyacetals, polyesters, polyamides, polyacrylates and epoxy resins.

Especially good results are obtained with poly-α-olefins, such as polyethylenes and polypropylenes, polyester, polystyrene and polyacrylate.

The novel stabilizers are incorporated into the polymer masses by customary methods. Alternatively, a solution, suspension or emulsion of the stabilizer can be mixed with the polymer per se or with a solution, suspension or emulsion thereof, whereupon the solvent is removed.

The stabilizers can be used either alone or in admixture with one or several stabilizers generally used in plastics processing, for example antioxidants on a phenolic and sulfidic basis, UV absorbers and light stabilizers, phosphite stabilizers, metal compounds, epoxide stabilizers and polyhydric alcohols. The plastics compositions to be stabilized may further contain flame retardants and pigments, dyestuffs, antistatic agents and fillers, for example glass fibers.

Examples of suitable antioxidants are those of the type of sterically hindered phenols, for example 2,6-di-tert.butyl-p-cresol, 2,6-dioctadecyl-p-cresol, 4,4'-butylidene-bis(2,6-di-tert.butyl-phenol), 4,4'-thio-bis(2-tert.butyl-5-methyl-phenol), phenolic triazine compounds, thiodipropionic acid esters of fatty alcohols, dioctadecyl sulfide and disulfide.

UV absorbers and light stabilizers to be used are, for example, 2-(2'-hydroxyphenyl)-benzotriazoles such as 2-(2'-hydroxy-5'-methylphenyl)-benzotriazole, 2-hydroxybenzophenones such as 2-hydroxy-4-octoxy-benzophenone, stabilizers of the salicylate group such as octylphenyl salicylate, nickel chelates, oxalic acid diamides and sterically hindered piperidine compounds.

Suitable phosphites are trisnonylphenyl phosphite, trislauryl phosphite and esters of pentaerythritol phosphite.

Metal compounds known as stabilizers include calcium, barium, strontium, zinc, cadmium, magnesium, aluminum and lead soaps of aliphatic carboxylic acids or hydroxycarboxylic acids having about 12 to 32 carbon atoms, salts of the said metals with aromatic carboxylic acids such as benzoates or salicylates as well as (alkyl)phenolates of the aforesaid metals, organo-tin compounds, for example dialkyl-tin thioglycolates and carboxylates.

Known epoxy stabilizers are, for example, epoxidized higher fatty acids, such as epoxidized soybean oil, tall oil, linseed oil, or epoxidized butyl oleate, and epoxides of long chain olefins.

Polyhydric alcohols to be used are, for example, pentaerythritol, trimethylolpropane, sorbitol or mannitol, i.e. preferably alcohols having 5 or 6 carbon atoms and 3 to 6 OH-groups.

An effective stabilizer combination for poly-$\alpha$-olefins, such as high, medium and low pressure polymers of $C_2$ to $C_4$-$\alpha$-olefins, especially polyethylene and polypropylene, or copolymers of the said $\alpha$-olefins consists, for example, of 0.01 to 5 parts by weight of one of the compounds to be used according to the invention, 0.05 to 5 parts by weight of a phenolic stabilizer, optionally 0.01 to 5 parts by weight of a sulfur-containing costabilizer, optionally 0.01 to 3 parts by weight of a basic or neutral metal soap, such as calcium stearate or zinc stearate, optionally 0.1 to 5 parts by weight of a phosphite and optionally 0.01 to 5 parts by weight of a known UV stabilizer from the group of alkoxy-hydroxybenzophenones, 4-hydroxyphenylbenzotriazoles, benzylidene-malonic acid mononitrile esters, or so-called quenchers, for example nickel chelates, all parts being calculated on 100 parts by weight of polymer.

The following Examples serve to further illustrate the invention.

EXAMPLE 1

50 Grams of bis-(2,2,6,6-tetramethyl-4-piperidyl) fumarate, 500 ml of isooctane and 2 g of $\alpha,\alpha'$-azobisisobutyronitrile were introduced into a 2 liter steel autoclave provided with a magnetic type lifting agitator. Thereafter 50 bars of ethylene were introduced under pressure, whereupon the mixture was heated for 5 hours at 90° C., a final pressure of 85 bars thus being established. Subsequently the mixture was filtered, while hot, introduced with stirring into 500 ml of ethyl acetate, and the separating solids were suction-filtered.

There were obtained 78 g of a bis-(2,2,6,6-tetramethyl-4-piperidyl)-fumarate -ethylene copolymer of a melting point of 105° C. with a molecular weight of 4990.

Analysis: C=77.0%, H=12.5%, N=3.5%.

EXAMPLE 2

In a manner analogous to that of Example 1 there were introduced 42 g of bis-(2,2,6,6-tetramethyl-4-piperidyl) fumarate, 500 ml of butyl acetate and 4 g of $\alpha,\alpha'$-azobisisobutyronitrile (AIBN). 50 Bars of ethylene were introduced under pressure, and copolymerization was carried out for 7 hours at 90° C., whereupon the final pressure was 68 bars. Subsequently the mixture was filtered, while hot, and after cooling the precipitated solids were suction-filtered.

Yield: 109 g Melting point 107° C. Molecular wt.: 2,170.

Analysis: C=78.1%, H=13.0%, N=2.8%.

EXAMPLE 3

39.4 Grams of bis-(2,2,6,6-tetramethyl-4-piperidyl) fumarate, 500 ml of butyl acetate and 4 g of AIBN were introduced into a steel autoclave. 50 Bars of ethylene were introduced under pressure, and the mixture was heated for 6 hours at 120° C., a final pressure of 90 bars thus established. Thereafter the batch was rotated to dryness, until a solid substance was obtained.

Yield: 100 g Melt. pt. 100° to 107° C. Molec. wt.: 1,430.

Analysis: C=77.3%, H=12.9%; N=3.0%.

EXAMPLE 4

Operations were the same as in Example 3, save for using bis-(2,2,6,6-tetramethyl-4-piperidyl) maleinate, a final pressure of 85 bars thus being established. There were obtained 96 g of a bis-(2,2,6,6-tetramethyl-4-piperidyl)-maleinate-ethylene copolymer having a melting point of 100° to 105° C. and a molecular weight of 1140.

Analysis: C=77.9%, H=13.1%, N=2.8%.

EXAMPLE 5

10 Grams of bis-(2,2,6,6-tetramethyl-4-piperidyl) fumarate, 9 g of acrylic acid methyl ester and 0.5 g of AIBN as catalyst were heated for 9 hours in 50 ml of butyl acetate at 100° to 110° C. under a nitrogen atmosphere. After concentration there remained 17 g of a bis-(2,2,6,6-tetramethyl-4-piperidyl) fumarate-acrylic acid methyl ester copolymer having a melting point of from 73° to 78° C.

Analysis: C=60.9%, H=8.7%, N=3.6%.

Molecular weight: 2,070.

In an analogous manner the copolymerization was carried out with the corresponding maleinate.

Yield: 18.5 g of a resin.

EXAMPLE 6

At first there was prepared a fumaric acid dimethyl ester-ethylene copolymer according to the following method: 200 g of fumaric acid dimethyl ester, 1000 g of isooctane and 10 g of α,α'-azobisisobutyronitrile were introduced, 40 bars of ethylene were introduced under pressure, and the batch was heated for 5 hours at 90° C., a final pressure of 79 bars thus being established. Thereafter the solvent was removed in vacuo. 225 Grams of a product having a melting point of 120° to 140° C. were obtained. The ester number was 550 (theoretical value for a 1:1 copolymer: 561), the molecular weight being 2970.

51.6 Grams of the above copolymer, 300 ml of xylene (absolute), 94.2 g of 2,2,6,6-tetramethyl piperidinol-4 and 0.5 g of lithium amide were introduced in a 1 liter stirring apparatus provided with a column of 30 cm and a mounted distilling device. While passing a small amount of $N_2$ through the apparatus, 20 g of reaction methanol in admixture with a small amount of xylene were distilled off within 3 hours. The reaction solution was then washed with water and freed from the solvent in the rotation evaporator. The product represented a resin having a molecular weight of 1900.

Analysis: C=67.9%, H=10.0%, N=6.4%.

EXAMPLE 7

At first, the following maleic acid anhydride-olefin copolymers were prepared:

(a) Ethylene-maleic acid anhydride copolymer

49 Grams of maleic acid anhydride, 400 g of toluene and 4 g of AIBN were introduced into a steel autoclave. 50 Bars of ethylene were introduced under pressure, whereupon stirring was continued for 8 hours at 90° C. (final pressure 97 bars). Subsequently the mixture was rotated to dryness, whereupon 75 g of a solid substance were obtained. Melting point 180° to 185° C.

(b) Propylene-maleic acid anhydride copolymer

Operations were carried out in a manner analogous to that of Example 7a, save for using 10 bars of propylene (final pressure < 10 bars).

Yield: 71 g, melting point 165° to 170° C.

(c) Octene-maleic acid anhydride copolymer

98 Grams of maleic acid anhydride, 112 g of octene-1, 800 g of toluene and 4 g of AIBN were stirred for 9 hours at 90° C. Subsequently the mixture was rotated to dryness, the unreacted starting material being evaporated in the process.

Yield: 90 g, melting point 59° C.

(d) Dodecene-maleic acid anhydride copolymer

Operations were the same as in Example 7 c, with 117 g of solid substance being obtained. Melting point 70° to 75° C.

To follow upon the process, these copolymers were reacted with 2,2,6,6-tetramethyl piperidinol-4.

(α) 12.6 Grams of the copolymer obtained according to (a) and 15.7 g of 2,2,6,6-tetramethyl piperidinol-4 were heated for 8 hours in 100 ml of dimethylformamide at 80° C. In the course of this process the desired ethylene-maleic acid-2,2,6,6-tetramethyl-4-piperidyl semiester copolymer precipitated and was extracted by filtration.

Melting point 178° to 185° C.

Yield: 25 g.

Analysis: C=61.7%, H=9.5%, N=5.7%.

(β) The preparation was effected according to (α) from the piperidinol and 14 g of the copolymer according to (b). There was obtained a propylene-maleic acid-2,2,6,6-tetramethyl-4-piperidyl semiester copolymer having a melting point of from 210° to 217° C.

Yield: 28 g.

Analysis: C=61.3%, H=9.4%, N=4.7%.

(γ) Operations were carried out in a manner analogous to that of (α), save for using 21.0 g of the copolymer of Example (c) and the piperidinol.

Yield: 16 g of octene-1-maleic acid-2,2,6,6-tetramethyl-4-piperidyl semiester copolymer having a melting point of 202° to 210° C.

Analysis: C=67.1%, H=9.4%, N=4.0%.

(δ) Operations were the same as in (α), save for using 26.6 g of the copolymer according to (d) and the piperidinol. Melting point 166° to 170° C.

Yield: 32 g.

Analysis: C=67.3%, H=10.7%, N=4.0%.

EXAMPLE 8

10.1 Grams of a styrene-maleic acid anhydride copolymer (SMA resin 2625 A of Sinclair Petrochemicals) and 20.4 g of 2,2,6,6-tetramethyl-4-stearylaminopiperidine were heated in 200 ml of dimethylformamide for 10 hours at 80° C. Thereafter the mixture was evaporated to dryness, 28 g of a styrene-maleic acid-2,2,6,6-tetramethyl-4-stearylaminopiperidyl semiester copolymer thus being obtained which had a melting point of from 110° to 118° C.

Analysis: C=74.9%, H=11.8%, N=6.2%.

EXAMPLE 9

41 Grams of a styrene-maleic acid anhydride copolymer (SMA resin 2625 A of a Sinclair Petrochemicals) were stirred with 31.4 g of 2,2,6,6-tetramethyl-piperidinol-4 in 200 ml of anhydrous dioxan for 4 hours at 100° C. under a nitrogen atmosphere. A solid substance precipitated which was suction-filtered and dried. Yield: 55 g of a styrene-maleic acid-2,2,6,6-tetramethyl-4-piperidyl semiester copolymer having a melting point of from 199° to 220° C.

Analysis: C=71.7%, H=8.3%, N=2.0%.

Molecular weight 1010.

EXAMPLE 10

35 Grams of an octadecene-1-maleic acid anhydride copolymer (PA 18 of Gulf Oil Chemicals Company) and 15.7 g of 2,2,6,6-tetramethyl piperidinol-4 were heated at reflux temperature for 16 hours under a nitrogen atmosphere in 200 g of absolute toluene. Subsequently the mixture was rotated to dryness and dried.

There were obtained 48 g of a maleic acid-2,2,6,6-tetramethyl-4-piperidyl semiester-octadecene-1-copolymer having a melting point of from 168° to 172° C.

Analysis: C=72.0%, H=11.8%, N=2.7%.

Molecular weight: 1,580.

EXAMPLE 11

17.5 Grams of the starting material used in Example 10, 10.6 g of 2,2,6,6-tetramethyl-4-butylaminopiperidine and 200 ml of toluene were refluxed for 16 hours under a nitrogen atmosphere and subsequently rotated to dryness. There were obtained 25 g of a maleic acid-2,2,6,6-tetramethyl-4-butylaminopiperidyl-semiamidoctadecene-1 copolymer having a melting point of from 158° to 162° C.

Analysis: C=73.1%, H=12.1%, N=4.7%.
Molecular weight: 1,390.

EXAMPLE 12

Operations were carried out as in Example 11, using the starting material employed in Example 10 and 12.0 g of 2,2,6,6-tetramethyl-4-hexylaminopiperidine. Yield: 27.1 g of a maleic acid-2,2,6,6-tetramethyl-4-hexylaminopiperidyl-semiamidoctadecene-1 copolymer having a melting point of from 159° to 163° C.

Analysis: C=73.9%, H=12.4%, N=4.5%. Molecular weight: 1140.

EXAMPLE 13

Operations were the same as in Example 11, save for using 20.4 g of 2,2,6,6-tetramethyl-4-stearylaminopiperidine and the copolymer employed in Example 10.

There were obtained 37.1 g of a maleic acid-2,2,6,6-tetramethyl-4-octadecylaminopiperidyl-semiamide-octadecene-1 copolymer having a melting point of from 141° to 147° C.

Analysis: C=77.2%, H=13.3%, N=3.3%.
Molecular weight: 1,120.

EXAMPLE 14

12.6 Grams of the copolymer obtained according to Example 7a were stirred in 100 ml of dimethylformamide with 21.2 g of 2,2,6,6-tetramethyl-4-butylaminopiperidine for 5 hours at 90° to 100° C. In the course of the reaction, a fine-grain precipitate separated which was suction-filtered, washed with ether and dried.

Yield: 32 g, melting point 122° to 124° C.
Analysis: C=59.4%, H=10.2%, N=9.7%.

In an analogous manner, the starting material was reacted with 24 g of 2,2,6,6-tetramethyl-4-hexylaminopiperidine and evaporated to dryness.

Yield: 32 g, melting point 196° to 208° C.

In an analogous manner, said starting material was reacted with 40.8 g of 2,2,6,6-tetramethyl-4-octadecylaminopiperidine and rotated to dryness.

Yield: 47 g, melting point 164° to 179° C.

EXAMPLE 15

In a manner analogous to that of Example 14 the precopolymer of Example 7(b) was reacted and the reaction solution was rotated to dryness, 30 g of a polymer having a melting point of from 225° to 230° C. thus being obtained.

EXAMPLE 16

In a manner analogous to that of Example 14 the prepolymer of Example 7(c) was reacted, which process yielded 35 g of a solid substance having a melting point of from 223° to 234° C.

EXAMPLE 17

In a manner analogous to that of Example 14 the prepolymer of Example 7(d) was reacted. Yield: 22 g, melting point 187° to 194° C.

EXAMPLE 18

This Example shows the volatility of the copolymers of the invention as compared against products of the next-comparable state of the art.

The volatility values were determined in an apparatus for thermogravimetric analysis. For this purpose, equal amounts (500 mg) of the copolymers of the invention and the reference substances were heated in a nitrogen atmosphere with a heating rate of 2 K/minute to 300° C., and the loss of material was measured in mg/cm$^2$ of melt surface. The results are given in the following Table:

| Polymer acc. to Example | Loss in weight in mg/cm$^2$ of surface on reaching ... °C. | | | after 10 min. at 300° C. |
|---|---|---|---|---|
| | 220 | 260 | 300 | |
| 1 | 0.01 | 0.64 | 9.70 | 19.08 |
| 2 | 0.03 | 0.95 | 9.06 | 16.85 |
| Comparison 1[1] | 0.95 | 2.38 | 17.49 | 65.87 |
| Comparison 2[2] | 0.05 | 1.11 | 9.54 | 58.83 |
| Comparison 3[3] | 2.70 | 18.30 | 114.48 | 135.15 |

[1] Bis-(2,2,6,6-tetramethyl-4-piperidyl)-sebacate (German Patent No. 1,929,928, German Offenlegungsschrift No. 2,204,659)
[2] polymer according to Example 1 of German Offenlegungsschrift No. 2,719,131
[3] bis-(2,2,6,6-tetramethyl-4-piperidyl)-fumarate

EXAMPLE 19

100 Parts by weight of polypropylene having a melt flow index i$_5$ of about 6 g/10 min. (determined according to ASTM D 1238-62 T) and a density of 0.9 were mixed with 0.1 part by weight of pentaerythrityl-tetrakis-[3-(3,5-di-tert.-butyl-4-hydroxyphenyl)-propionate], 0.2 part by weight of calcium stearate and the stabilizer of the invention to be tested, the amount of stabilizer being such that it contained 0.0175 part by weight of stabilizer nitrogen each time.

In order to ensure a distribution as uniform as possible on the polymer particles, the stabilizers were dissolved in a solvent and the solution was added dropwise to the polypropylene powder, while stirring and simultaneously exposing the mixture to the radiation of an IR lamp for evaporating the major portion of the solvent. After about 20 minutes the calcium stearate was added and mixing was continued for another 10 minutes. Solvent residues were removed by drying for 120 minutes at 50° C. in a drying cabinet.

The polypropylene was injection-molded on a Windsor injection molding machine of the SP 50 type at 240° C. to give plates of the dimensions 60×60×1 mm. From these plates, test specimens were cut out according to DIN 53 455, form 3, reduced scale 1:3. The test specimens used for comparison were manufactured in an analogous manner, however, while omitting the stabilizer to be tested or while adding the reference stabilizers.

In order to determine the stability to light of the specimens, the latter were subjected to radiation with light intensity variations in a Xenotest-1200 apparatus of Original Hanau Quarzlampen GmbH. The intensity of radiation was modulated by UV filter (special filter glass d=1.7 mm). The stability to light was tested according to DIN 53 387 (moistening for 17 minutes, sprinkling for 3 minutes, blackpanel temperature 45° C., air humidity 70 to 75%). The period of radiation was measured in hours, and the elongation at break was determined on a tensile tester of Messrs. Instron at a draw-off speed of 5 cm/min.

| Stabilizer acc. to Example (part by wt.) | | Radiation period in hours | Elongation at break determined in % of the initial value |
|---|---|---|---|
| 1 | (0.50) | 1 000 | >50 |
| 2 | (0.62) | 1 000 | >50 |
| Comparison 1 | (0.30) | 1 000 | 1 |
| Comparison 2 | (0.37) | 300 | 50 |
| Polypropylene[1] | | 260 | <1 |
| Comparison[2] | | 320 | <1 |

[1]without any stabilizer
[2]only with Ca-stearate and pentaerythrityl compound

EXAMPLE 20

0.1 to 0.25 Part by weight of the stabilizers indicated below are mixed to polypropylene (Hostalen PPU VP 1770 F) having a melt flow index MFI 190/51.9 g/10 min. (cf. DIN 53 735) via a laboratory high-speed mixer. The material thus stabilized was melted in a laboratory extruder under the common processing conditions and processed via a spinning pump with multiple spinning head into monofilaments (87 dtex) which where subsequently after-stretched in the ratio of 1:2.5. 24 Each of these filaments were textured to a yarn which was processed into test fabrics. The samples were subjected in a fadeometer to a test for the fastness to light and after the indicated period of exposure to light they were tested by the finger nail test (slight rubbing of the fabric with the thumb nail). 0=no damaging, 1 to 5=increasing tendency to destruction

| Stabilizer acc. to Example (parts by weight) | Destruction of the fabric after ... hours of exposure to light | | |
|---|---|---|---|
| | 40 | 80 | 160 |
| 1 (0.1) | 0 | 0 | 0 |
| without stabilizer | 0 | 2 | 5 |
| comparison[1](0.1) | 0 | 0 | 3 |
| comparison[1](0.25) | 0 | 0 | 1 |

[1]Bis-(2,2,6,6-tetramethyl-4-piperidyl) sebacate (German Patent No. 1,929,928, German Offenlegungsschrift No. 2,204,659)

EXAMPLE 21

Polypropylene plates according to Example 19 were treated for 168 hours at 80° C. in distilled water. Subsequently test specimens were cut out, as has been described in Example 19. The stability to light was tested in a Xenotest-450 apparatus of Original Hanau Quarzlampen GmbH with a combination of 6 IR and 1 UV filters according to DIN 53 387 (accelerated test of weathering resistance). During the exposure to light blackpanel temperature was 43° C.±1° C., the relative humidity in the test chamber was 70%±1%. Every 2 hours fresh air was passed through the test chamber for 5 minutes. The elongation at break was determined on a tensile tester of Messrs. Instron at a drawoff speed on 5 cm/minute after a defined period of exposure. The test results are listed in the following Table:

| Stabilizer acc. to Example | Exposure period in hours | Elongation at break determined in % of the initial value |
|---|---|---|
| 1 | 700 | >50 |
| 2 | 700 | >50 |
| comparison[1] | 700 | <50 |

[1]Bis-(2,2,6,6-tetramethyl-4-piperidyl) sebacate

EXAMPLE 22

Polyethylene of low density (Hostalen LD J 4024), stabilized with 0.3 part by weight of stabilizer, was injection-molded in a manner analogous to that of Example 19 to give plates of the dimensions 60×60×1 mm and stored for 24 hours at 90° C. Thereafter the plates were examined to find out whether a coating of the stabilizer had formed at the surface. 0=no coating, 1=coating, 2=strong coating which could easily be wiped off

| Stabilizer acc. to Example | Coating |
|---|---|
| 1 | 0 |
| 2 | 0 |
| comparison[1] | 2 |

[1]Bis-(2,2,6,6-tetramethyl-4-piperidyl) sebacate

What is claimed is:

1. Copolymers, useful as light stabilizers for synthetic polymers, of one or several polyalkyl piperidines of the formula (I).

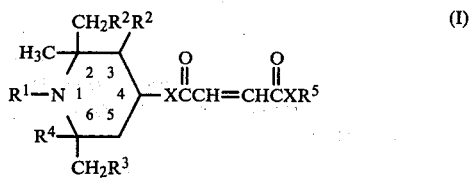

and one or several comonomers of the formula (II)

in which the molar ratio of (I) to (II) is about 1:1 and wherein the monomers of formula (I)

R$^1$ is hydrogen or C$_1$ to C$_{18}$—alkyl,

R$^2$ and R$^3$ are either the same and represent hydrogen or C$_1$ to C$_5$—alkyl, in which case R$^4$ is methyl, or R$^2$ is hydrogen or C$_1$ to C$_5$—alkyl, in which case R$^3$ and R$^4$, together with the carbon atoms to which they are bound, represent a C$_5$ or C$_6$—cycloalkyl group or a group of the formula (III)

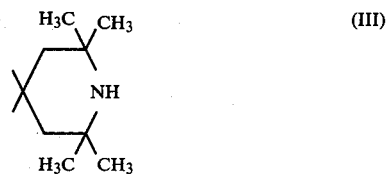

R$^5$ is hydrogen, C$_1$ to C$_{18}$—alkyl or a group of the formula (IV)

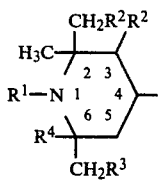

in which $R^1$, $R^2$, $R^3$ and $R^4$ are defined as above, and

X stands for an oxygen atom or a group

$R^6$ being hydrogen, $C_1$ to $C_{18}$—alkyl or a group of the formula (IV), whereas in the monomers of the formula (II)

$R^7$ is hydrogen or a group of formula $COOR^{10}$ with $R^{10}$ being $C_1$ to $C_{18}$—alkyl, $R^8$ is hydrogen or methyl, and $R^9$ is hydrogen or $C_1$ to $C_{36}$—alkyl, or phenyl, or chlorine, or acetyl, or a group of formula —$OR^{11}$ with $R^{11}$ being hydrogen or $C_1$ to $C_{18}$—alkyl, or a group of the formula —$COOR^{12}$ with $R^{12}$ being alkyl or hydroxyalkyl with 1 to 18 carbon atoms or a radical of the formula (IV).

2. Process for the manufacture of copolymers as claimed in claim 1, which comprises either a. copolymerizing a monomer or a monomer mixture of the formula (I) with about an equimolar amount of a comonomer or comonomer mixture of the formula (II) in an organic solvent or in water in the presence of from 0.01 to 15% by weight of an ion forming agent or of a common radical forming agent and of from 0 to 6% by weight of an emulsifier, each calculated on the total amount of the monomers, at 50° to 180° C., the working pressure in the case of gaseous comonomers being in the range of from 20 to 200 bars, or b. copolymerizing at first a lower alkyl ester of fumaric acid or maleic acid or maleic acid anhydride under the conditions indicated under (a) with the equimolar amount of one or several monomers of formula (II), whereupon the resulting copolymer is further reacted with a polyalkyl piperidine compound of formula (VI)

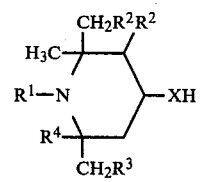

in which $R^1$, $R^2$, $R^3$, $R^4$ and X are defined as in claim 1, in a way that the mixture is heated in an inert solvent to 50° to 150° C.—when using a maleic acid anhydride copolymer—and to 80° to 250° C. with the addition of a transesterification catalyst, when using a fumaric or maleic acid ester copolymer, wherein in the case where $R^5$ is to be $C_1$ to $C_{18}$—alkyl, the corresponding alcohol or the corresponding amine is to be added in the equimolar amount, calculated on the polyalkyl piperidine compound.

* * * * *